(12) United States Patent
Chayat et al.

(10) Patent No.: US 8,483,204 B2
(45) Date of Patent: Jul. 9, 2013

(54) APPARATUS AND SYSTEM FOR USING RELAY STATION IN A TDD WIRELESS NETWORK

(75) Inventors: Naftali Chayat, Kfar Saba (IL); Ze'ev Roth, Kadima (IL); Vladimir Yanover, Herzlia (IL); Mark Altshuller, Ganot Hadar (IL); Oleg Marinchenco, Modein (IL)

(73) Assignee: Alvarion Ltd., Tel Aviv (IL)

( * ) Notice: Subject to any disclaimer, the term of this patent is extended or adjusted under 35 U.S.C. 154(b) by 254 days.

(21) Appl. No.: 12/987,811

(22) Filed: Jan. 10, 2011

(65) Prior Publication Data

US 2011/0170460 A1    Jul. 14, 2011

(30) Foreign Application Priority Data

Jan. 10, 2010   (IL) .......................................... 203232

(51) Int. Cl.
*H04J 3/06* (2006.01)

(52) U.S. Cl.
USPC ............ 370/350; 370/503; 370/516; 370/519

(58) Field of Classification Search
USPC ................. 370/277, 280, 321, 324, 328, 331, 370/337, 350, 352, 395.4, 432, 442, 478, 370/503, 507, 509–510, 516, 517, 519; 455/432.1, 436
See application file for complete search history.

(56) References Cited

U.S. PATENT DOCUMENTS

| | | | |
|---|---|---|---|
| 5,883,884 A | 3/1999 | Atkinson | |
| 7,386,036 B2 | 6/2008 | Pasanen et al. | |
| 2007/0060050 A1* | 3/2007 | Lee et al. | 455/13.1 |
| 2007/0217367 A1* | 9/2007 | Lee et al. | 370/335 |
| 2008/0002610 A1* | 1/2008 | Zheng et al. | 370/328 |
| 2008/0107061 A1* | 5/2008 | Tao et al. | 370/315 |
| 2008/0151809 A1* | 6/2008 | Chindapol et al. | 370/315 |
| 2008/0285500 A1* | 11/2008 | Zhang et al. | 370/315 |
| 2009/0097433 A1* | 4/2009 | Shen et al. | 370/315 |
| 2009/0252203 A1 | 10/2009 | Goldhamer | |

OTHER PUBLICATIONS

Part 16: Air Interface for Broadband Wireless Access Systems, Amendment 1: Multihop Relay Specification, IEEE Standard for Local and metropolitan area networks, Jun. 12, 2009, 314 pages.
Sydir, et al., "An evolved Cellular System Architecture Incorporating Relay Stations", IEEE Communications Magazine, Jun. 2009, pp. 115-121.

* cited by examiner

*Primary Examiner* — Michael Thier
*Assistant Examiner* — Redentor Pasia
(74) *Attorney, Agent, or Firm* — Browdy and Neimark, PLLC

(57) ABSTRACT

A Relay Station (RS) is provided. The RS is adapted to operate in a TDD type of wireless communication network which comprises at least one base station (BS) operative to communicate with the RS and with an IP network, and a plurality of Mobile Subscribers (MSs). The RS comprises: a subscriber terminal operative in conformity with IEEE 802.16e Standard; and a BS operative in conformity with said IEEE 802.16e Standard, and wherein that subscriber terminal and that BS that belong to the RS are connected to each other, and wherein all communications transmitted from the at least one BS to the RS are in conformity with the IEEE 802.16e Standard.

6 Claims, 3 Drawing Sheets

APPARATUS AND SYSTEM FOR USING RELAY STATION IN A TDD WIRELESS NETWORK

FIELD OF THE INVENTION

The present invention relates generally to digital wireless communications systems and devices, and in particular, to systems and devices for providing services in a wireless network comprising relay stations.

BACKGROUND OF THE INVENTION

In traditional mobile IEEE 802.16 networks, a given coverage area is typically divided into smaller areas referred to as cells. A base station (BS), often located at the center of the cell, provides coverage to the mobile stations (MSs) within the cell. The BS is connected to the core network via a backhaul connection, typically provided by a wired or point-to-point microwave link. Within each cell, the BS communicates with MSs that are associated with it, using a specific type of Point-to-MultiPoint (PMP) link in which a central device (e.g. the BS) is connected to multiple peripheral devices (e.g. MSs). This type of connection means that any transmission of communications such as data that originate from the BS is received by one or more MSs, while any transmission of communications that originate from any of the MSs is received only by the BS. Each BS manages the allocation of resources to enable it to communicate with the MSs served thereby, and informs the MSs about the resource allocations.

Unfortunately, the traditional deployment as described hereinabove suffers from certain inherent practical problems such as coverage discontinuity that exist due to shadowing and Non-Line-Of-Sight (NLOS) connections, low Signal-to-Noise-Ratio (SNR) at the cell edge, and non-uniform distribution of traffic e.g., in areas having sub-areas that are densely populated areas (hotspots). In addition, another challenge that is becoming widespread in recent years is the increasing demand for higher data rates required by the MSs which causes more and more BSs to serve smaller and smaller cells (i.e. the cell coverage area literally shrinks). Such a solution becomes costly since the provisioning of backhauling links to a large number of BSs is expensive. In order to meet the growing demand and the strict requirements for coverage, throughput and capacity increase, as well as to meet a reasonable cost structure, the deployment of Relay Stations (RSs) has been considered as a promising solution to IEEE 802.16 PMP networks as well as for other wireless networks. However, in order to implement this promising solution, it has been decided by the IEEE 802.16 Standardization body that the IEEE 802.16e Standard cannot provide an adequate solution and therefore it was required to extend the IEEE 802.16 Standard by drafting an additional Standard amendment that supports such type of operation with RSs, namely, the IEEE 802.16j Standard.

In order to better appreciate the IEEE 802.16j solution, one must first consider the nature of the Relay Station. The RS is an entity that is wirelessly connected to the BS on one side and to a group of MSs on the other. The connection to the BS is commonly referred to as the Feeding Link or sometimes as the Relay backhaul link, while the connection to the MSs, where the RS essentially functions as a BS for these MSs, is called the Relay Access Link (as it provides Access service to the MSs connected to it). The RS operates using a "store and forward" paradigm. It receives the data selectively at specific time/frequency allocations as determined by the BS, decodes and processes the data, and subsequently transmits (relays) this data using different air interface resources. The two major advantages of using the relaying concept are the increase in frequency reuse resulting from the fact that the BS and RSs within a cell may each communicate at the same time with different MSs while using the same frequency resources, and the reduction in the MSs (as well as BS) transmit powers due to the reduction in respective transmission ranges.

In order to better appreciate the IEEE 802.16j solution, one must also consider that operating an RS in a network that operates using Time Division Duplexing ("TDD") paradigm poses constraints and challenges on the RS. IEEE 802.16e compliant systems operate by exchanging communication frames and the most common frame length is 5 ms duration (though other frame lengths are supported as well). Presently, the more widespread mode of operation of IEEE 802.16 compliant systems is Time Division Duplexing (TDD). TDD operation implies that the communication from the BS to the MSs (Downlink) and the communication from the MSs to the BS (Uplink) are carried out on the same frequency channel through the partitioning of each frame to a Downlink part and an Uplink part. As the difference between the transmit power and receive threshold of a RS can be in the order of 130 dB, TDD operation of an RS poses a problem since effectively the RS cannot transmit along its RS Access Link while receiving in its RS Feeding Link, or conversely the RS cannot transmit in its RS Feeding Link while receiving in its RS Access Link. This problem arises since it is not practical to consider isolation between the transmitting antenna and receiving antenna that would exceed 90 dB.

Still, this type of a solution of employing RS in wireless networks has gained some further popularity in the recent years with the introduction of broadband systems, having physical limitation of the cell size. Classical relays operate at the radio level, by amplifying the received signal and re-transmitting it, typically at a different frequency. Newer relays, sometimes referred to as Layer 2 relays, decode the signal and re-transmit it at a different point in time.

U.S. Pat. No. 5,883,884 describes a wireless communication system in which a base unit transmits outgoing TDM signals within a base transmission coverage area at a first frequency. Repeaters in the base coverage area receive the outgoing signal and retransmit it within respective repeater coverage areas at respective frequencies, maintaining the same time slot orientation in TDM format, where several levels of repeaters form a hierarchy covering the expanded range. The remote subscriber units located in a coverage area receive the strongest outgoing frequency signal from a repeater/base unit in a time slot assigned to that unit for a particular call. Incoming TDMA signals from remote units use the same time slots used in received outgoing signals. Each repeater receives outgoing signals from a lower level repeater (or from the base unit) at the transmission frequency of the lower level repeater, and immediately retransmits the signal in its own coverage at a different frequency. Incoming signals transmitted to any particular repeater from a remote unit in its coverage area, or from a higher level repeater, are at the outgoing transmission frequency for that repeater. The solution provided by this publication to reduce interruption during communications is that the repeaters and remote units switch between repeaters to communicate with the base unit depending upon received signal strength.

U.S. Pat. No. 7,386,036 discloses a wireless multi-hop system in which radio links between relays and users are optimized separately from the links between relays and base stations and in which multiple simultaneous data streams between relays and base stations are created. The system includes a base station (BS) connected to the core network with a link of wire line quality, relay stations (RS) connected to the BS with a first radio interface, and to subscriber stations (SS), with a second radio interface. The first and second radio interfaces can operate, at least in part, using the same frequency bandwidth, and the SS can also connect directly to the BS using the second radio interface if the BS is closer than any RS.

In our co-pending application published under US 20090252203, a method is provided for conveying wireless communications in a radio network using OFDMA or multi-carrier technologies. The relay station is capable of simultaneously transmitting (or receiving) communications to at least two recipients along a shared frequency channel.

Although deploying additional BSs may provide even better access link capacity than RSs, still, deployment of BSs with dedicated wired backhauls (or dedicated point-to-point microwave, millimeter-wave or optical backhauls) would not be the best cost-effective solution. On the other hand, when an RS is deployed, instead of a BS provided with a wired backhaul connection, no direct backhaul costs are involved. When the option is installing a BS with wireless backhaul, the deployment of an RS saves the need to purchase and maintain the microwave link equipment (as well as the purchasing of additional spectrum resources for the operation of that BS). Thus, the advantages of the less complex and lower cost RSs motivated IEEE working groups to develop the IEEE 802.16j Mobile Multi-hop Relay (MMR) Standard for increasing the coverage area and throughput of the IEEE 802.16e standard via the deployment of fixed or nomadic RSs.

Still, some major problems associated with the IEEE 802.16j are yet to be solved, namely, the need to purchase/modify equipment that is in compliance with the different communications patterns (frames) as defined by the IEEE 802.16j both for the BS and the RS.

In their article "An evolved Cellular System Architecture Incorporating Relay Stations", published in IEEE Communications Magazine, June 2009 (pp. 115-121), J. Sydir and R. Taori address the problem of incorporating relay stations in such wireless networks. Still, by their solution the operators must modify their equipment (or even will have to develop and install new equipment) in order for their equipment to support the IEEE 802.16j Standard according to which their network could operate in a relay mode.

With all the advantages of using the IEEE 802.16j Standard for the Multi-hop Relay, it still has few other drawbacks. For example the new requirements make the RS as a new entity that is not comprised by existing building blocks of IEEE 802.16e Standard (e.g. the BS or MS) that is far more complex than it was for use according to the IEEE 802.16e Standard, rendering the implementation of a network that supports the IEEE 802.16j Standard to be more expensive, so that service providers often refrain from upgrading their IEEE 802.16e deployment to support IEEE 802.16j Standard due to the high costs involved. Due to the above, to date, no single equipment vendor has yet developed an RS conforming to the IEEE 802.16j Standard. The present invention seeks to overcome the above described problems.

SUMMARY OF THE INVENTION

It is an object of the present invention to provide a system and devices to enable utilizing in-band backhaul relay stations while using IEEE 802.16e Standard compliant equipment building blocks to make an RS that will support IEEE 802.16e air interface for both the backhaul and on its access links.

It is another object of the present invention to enable a system that is operative strictly in conformity with IEEE 802.16e Standard, to execute handover from an RS to a BS.

Other objects of the invention will become apparent as the description of the invention proceeds.

In accordance with a first embodiment of the present invention, there is provided a Relay Station (RS) adapted to operate in a Time Division Duplexing (TDD) type of wireless communication network, that network comprising at least one Base Station (BS) operative to communicate with the RS and with an IP network, and a plurality of Mobile Subscribers (MSs), wherein the RS comprises:

a subscriber terminal operative in conformity with IEEE 802.16e Standard; and a BS operative only in conformity with that IEEE 802.16e Standard, and wherein the subscriber terminal and the BS comprised in the RS are connected to each other, and wherein all communications transmitted from the at least one BS operative to communicate with that RS to the RS, are in conformity with the IEEE 802.16e Standard.

The terms "IEEE 802.16e Standard" or "IEEE 802.16e" as used throughout the specification and claims should be understood to be part of the Standard IEEE 802.16-2009 that is the underlying standard of Mobile WiMAX equipment.

According to an embodiment of the invention, one or preferably both of the subscriber terminal and the BS comprising that RS is/are operative only in conformity with IEEE 802.16e Standard.

By yet another preferred embodiment of the invention, the RS and the at least one BS are operative to handover an MS that is currently being in communication with one, to be in communication with the other.

According to another aspect of the invention, there is provided a wireless communication system operative in a TDD mode comprising at least one Base Station (BS), one or more Relay Stations (RSs) as described hereinabove and a plurality of Mobile Subscribers (MSs), wherein the wireless communication system is characterized in that:

the at least one BS comprises at least two MAC entities operative in a single sector, wherein one of the at least two MAC entities is an access MAC entity operative to communicate with MSs located within that sector, whereas a second of the at least two MAC entities is an RS feeding MAC entity operative to communicate with the one or more RSs located in that sector, wherein a timeline of one of the MAC entities is shifted in time with respect to the other MAC entity, thereby allowing transmission of preambles associated with each of the access MAC entity and the RS feeding MAC entity, at different times;

wherein both a DL period and a UL period associated with each of the at least two MAC entities are divided into a silent part and an active part, so that the one or more RSs receive the preamble, control+MAP information and DL Data of the RS feeding MAC entity of the at least one BS at a time in which the one or more RSs do not convey transmissions to MSs along to their respective access links; and wherein the one or more RSs receive communications from MSs connected to their respective access links at a time at which the one or more RSs do not convey communications to the RS feeding MAC entity of that at least one BS.

According to a preferred embodiment of this aspect of the invention, the at least one BS and at least one of the one or more RSs are operative to handover an MS that is currently being in communication with one, to be in communication with the other.

In accordance with another preferred embodiment of the invention, the at least one BS is further operative to prevent any of the at least one MS being served by the at least one BS to connect to the at least one other of the at least two MAC entities that is used to communicate with at least one of the one or more RSs.

By yet another preferred embodiment, each of the at least two MAC entities is associated with a distinct timeslot different than any other of the at least two MAC entities, for the transmission of communications towards their respective destinations.

According to still another preferred embodiment, the at least one BS is further adapted to dynamically determine, based on one or more pre-defined criteria, air interface resources that will be allocated for conveying communications from the one or more RSs.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The principles and operation of the method and system that are in conformity with the present invention may be better understood with reference to the accompanying drawings and the following description that illustrate some specific non-limiting examples of preferred embodiments for carrying out the present invention.

As explained hereinbefore, according to a preferred embodiment of the present invention, a system that enables supporting a Relay operation in a sector of a TDD network is provided. The BS has at least two operative MAC entities, one for supporting the Access in the sector (i.e. the communication with MSs) while the second for supporting the Feeding of RSs (i.e. the communication with RSs) in that sector. The timeline of one of these MAC entities is shifted in time with respect to the other MAC entity. This implies that the preambles of these two MAC entities are transmitted at different times. Both the DL period and the UL period of the two MAC entities are partitioned to a silent part and an active part, and are designed such that the RS receives the preamble, the control+MAP, and the DL Data of the Feeding MAC entity at a time in which it does not transmit to MSs connecting to its access link. Similarly, the RS receives from MSs connected to its Access link at a time at which it is not transmitting to the Feeding MAC entity. The RS in this preferred embodiment is comprised of an IEEE 802.16e compliant MS and an 802.16e compliant BS connected "back to back" to each other, for example, by Ethernet connection.

Figure 1:
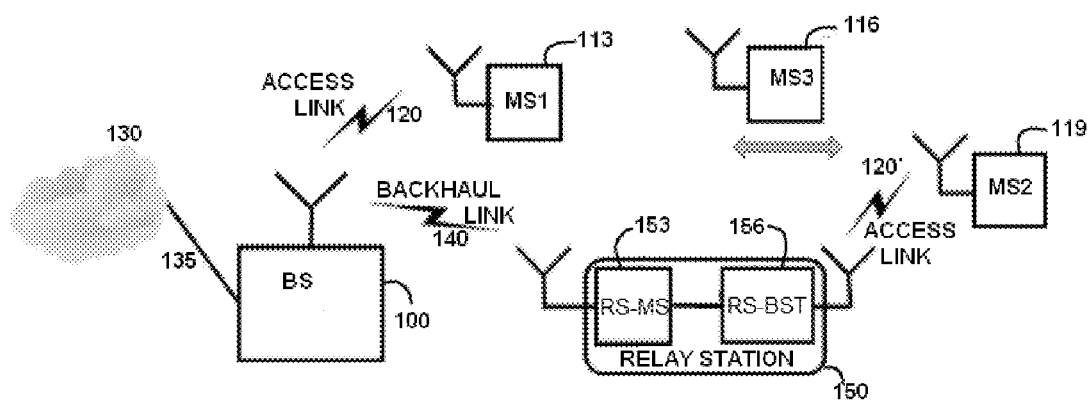
FIG. 1—describes a configuration of an example sector in a wireless network.

FIG. 1 describes a configuration of an example cell operative according to the present invention. BS (100) is connected to the Internet cloud (130) via a wired or wireless connection (135), and at the other side, it is connected wirelessly to other entities located within the served cell, namely MS1 (113), MS2 (119), MS3 (116) and RS (150). MS1 (113), located in a nearby proximity to BS 100 is wireless directly connected to the BS through access link 120 (i.e. it receives its access service from BS 100). MS2 (119) on the other hand, which is located far away from BS 100, receives its access service from RS 150. If MS2 were to communicate directly with BS 100 both their transmission power had to be substantially increased, which could have led to interference in the transmissions to/from MS1. For the convenience of the reader, RS (150) is described herein as being comprised of two entities, an RS-MS (153) part, in which the relay station acts as if it were an MS and communicates with the BS through a backhaul link (140), and the RS-BS (156) part, where the relay station acts as a simple BS, and communicates with its adjacent MSs (in this example MS2) via access link 120'. MS3 (116) is located at such a distance where it can be serviced either by BS (100) or by RS (150) exemplifying a situation of an MS that may be undergoing handover from one to the other. The decision of which would be the communicating entity may preferably be determined in accordance with the direction of the MS 116 own movement.

Figure 2:
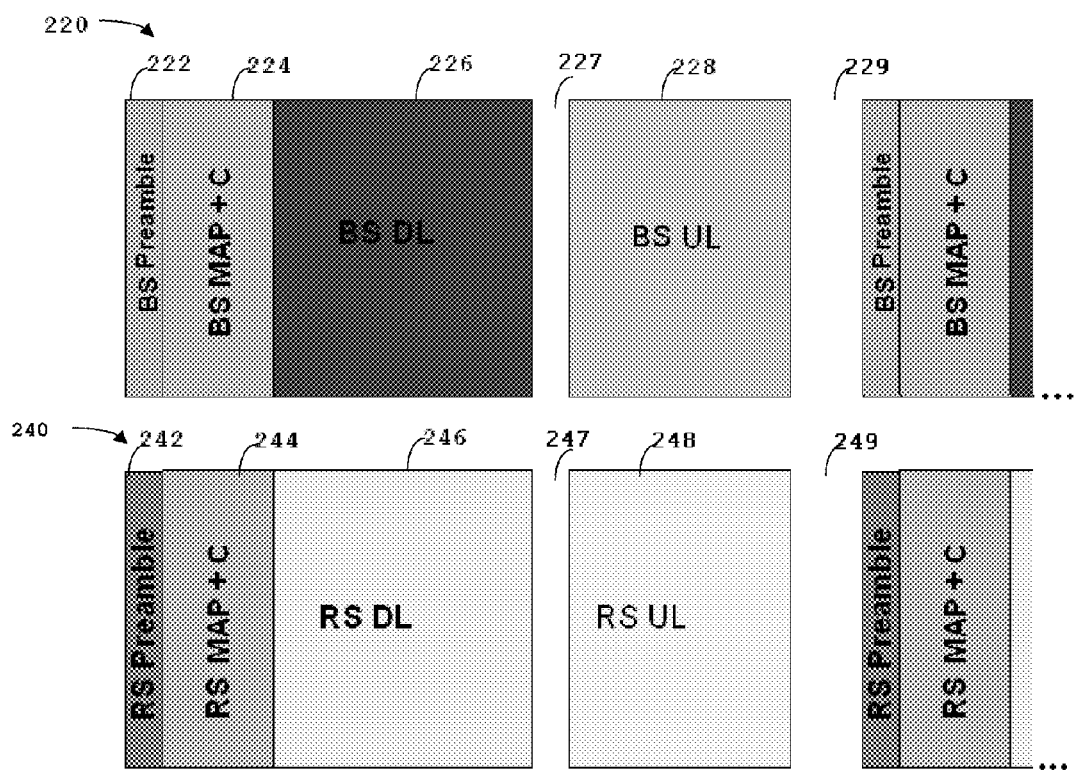
FIG. 2—demonstrates the problem of RS operation in a TDD mode, as the RS is required to transmit the Preamble (as well as other DL data) on its Access link at essentially the same time that the BS transmits on its Access Link.

The main difficulty in implementing in-band backhaul using a regular IEEE 802.16e complying equipment with regular TDD, lies with the fact that in order to allow the MS to move while still retaining its connectivity, it is required that the preambles of the transmissions received by the MS from all neighboring BSs, are received at about the same time (difference in time is mostly attributed to signal propagation times over the air). We describe the challenges (and drawbacks) in FIG. 2 which illustrates the problem of utilizing TDD Relay Station according to solutions known in the art (i.e. when the RS operates in a TDD mode). As may be seen in this Fig., the RS is required to transmit the preamble (and other DL data) on its Access Link (240) at essentially the same time as the BS transmits on its Access Link (220). The upper part of FIG. 2 illustrates a frame (220) transmitted from BS 100, while the bottom part of FIG. 2 illustrates a frame (240) transmitted concurrently from the RS (150). Each frame comprises basically six parts: a preamble (222, 242), control+MAP (224, 244), DL zone (226, 246), a Tx to Rx transition time (227, 247), an UL zone (228, 248) and a Rx to Tx transition time (229, 249). In addition to the requirement that the MS receives the preamble from all neighboring BSs at about the same time, the MS is required according to the IEEE 802.16e Standard to receive the preamble and the MAP of the BS that provides its access service. In view of the above, the problem in using such an RS is clear. If the RS part communicating with the BS needs to listen to the BS preamble and MAP while at the same time the RS is required to transmit its own preamble and MAP on its Access Link to the MSs which are served by that RS, the RS part listening to the BS transmission is bound to suffer interfere from the RS transmission to its associated MSs.

Figure 3:
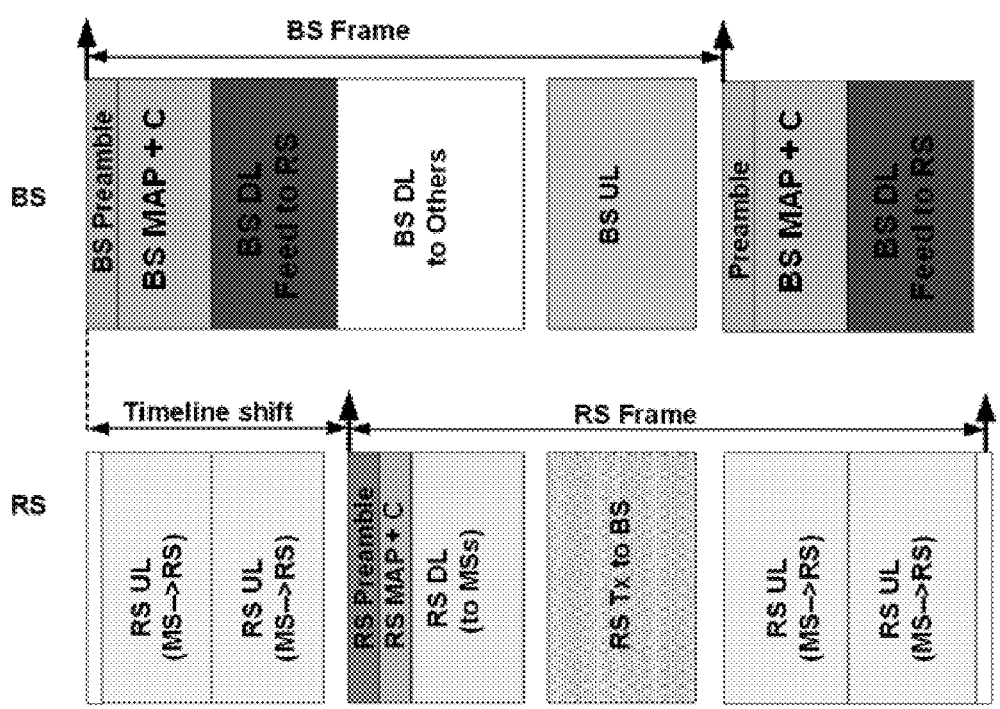
FIG. 3—presents an attempt to solve the TDD problem by shifting the timeline of the RS Access Link.

One possible approach to solve the problem illustrated in FIG. 2., is, to shift the RS timeline with respect to the BS timeline as illustrated in FIG. 3.

FIG. 3 demonstrates an attempt to solve the RS TDD problem by shifting the RS timeline relative to the BS timeline. However, the problem with this solution is that MSs that comply with the IEEE 802.16e Standard cannot undergo handover between the BS and the RS in such a setup. It is clear that such a shift if carefully planned can result with the RS listening to the BS Preamble (310) and transmitting its preamble (340) at a time when it is not expecting to receive control or data information from the BS (316). Thus, as stated above the problem with such a setup is that MSs communicating with the BS cannot be handed over using IEEE 802.16e technology to the RS, as the Preambles of these stations will not be received by the MS at the same time.

Therefore, although the solution illustrated in FIG. 3 solves the TDD problem, it does not support handover of MS from the BS to the RS or vice versa (as the Preambles are not transmitted at same time). Both these challenges are addressed by the solution provided by the present invention.

The solution provided by the present invention consists of using an RS apparatus which may be considered as comprising two back-to-back entities, one designated for communicating with the BS (e.g. such as a typical Customer Premises Equipment ("CPE")) and the other for communicating with the MSs (e.g. a BS). Preferably, the RS part communicating with the BS and the RS part communicating with the MS(s) are co-located, but that is not necessary, and in fact they may be separated geographically from each other, and all that is required is a connection (e.g. an Ethernet connection) between them that can extend up to kilometers of optical fiber, or up to kilometers of wireless link.

Complementing the above arrangement, the BS may be considered as comprising two (or more) MAC ("Media Access Control") entities that are time shifted, thus creating a zone in time which is offset from the BS access part, wherein the feeding links may be transmitted while using IEEE 802.16e type of frames, and wherein the time offset is relative to the access part.

Figure 4:
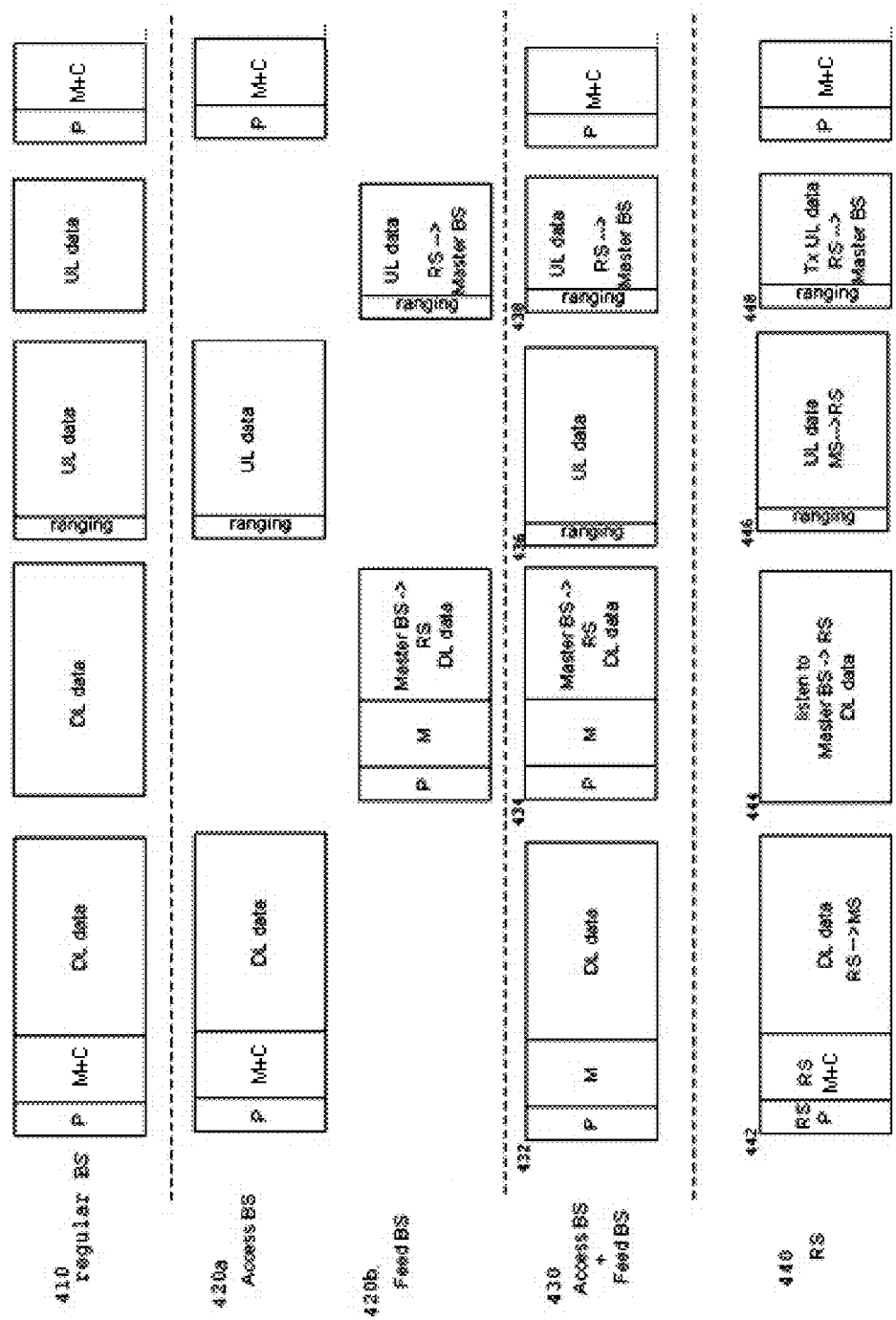
FIG. 4—presents timelines of a BS and an RS according to an example solution provided by the present invention.

FIG. 4 illustrates timelines of a BS and an RS according to an example solution provided by the present invention, showing two alternatives for implementing the Main (or Donor) BS. The first one is by using two units each implementing a single MAC entity, whereas the second alternative is having a single unit implementing two MAC entities.

Following are the underlying principles of the example illustrated in FIG. 4.

- A frame of a regular IEEE 802.16e compliant BS is illustrated in 410 comprising a preamble (P), a control+MAP (M) zone, a first DL data zone, a second DL data zone, a first UL data zone (includes the Ranging) and a second UL data zone. The horizontal axis in the Fig relates to time while the vertical axis in the Fig. relates to frequency (IEEE 802.16e is an OFDM/OFDMA system). The possibility of partitioning the DL into 2 zones is an attribute supported by the IEEE 802.16e standard (so is the UL).
- The Access MAC entity of the BS frame is illustrated in 420a. The second DL data zone of the Access MAC entity is silenced, meaning that in that zone the Access MAC entity does not transmit. This is an attribute of the 802.16e Standard.
- It is assumed that the transmissions of the Access MAC entity are synchronized to a 1-pps (e.g. derived from GPS).
- In the Feed MAC entity of the BS (420b), the start-of-frame is offset relatively to 1-PPS by a pre-defined value, e.g. 2 msec. This is illustrated in 420b by the P being shifted in time relatively to the P in 420a.
- The UL start times and zones of both the Access MAC entity and the Feed MAC entity are configured appropriately as shown in FIG. 4 (420a, 420b);
- The RS is allowed to connect/communicate only with the Feed MAC entity of the BS, and the MSs associated with that RS.
- The MSs served by the BS are not allowed to communicate with the Feed MAC entity. They can either be served by the Access MAC entity of the BS or they can be handed off to be served by the RS (or another BS or another RS).
- MSs served by the RS can be handed off to be served by any neighboring BS (Access MAC entities of BS) or any neighboring RS. They are not allowed to connect to Feed MAC entities of base stations.
- The ranging interval in the feed part should is almost never used, so that there can be an overlap with access UL time region (see ranging in 420b and UL data in 420a);
- In the RS there is no self-deafening (i.e. it does not transmit on either links while receiving on any of the other links), the handover ("HO") of an MS between RS to BS and from BS to RS is from the point of view of the IEEE 802.16e air interface, the same as HO between regular BS (though there may be some subtle differences at higher layers). Network entry is also standard (though MSs are precluded from connecting to Feed MAC entities).

Now, reverting to FIG. 4, the first row (410) presents a timeline of a regular prior-art BS that is dedicated only for access service. This BS has one MAC entity for which, as may be seen from this Fig., both the DL and the UL may be partitioned into two zones.

The second and third rows (420a and 420b) from the top, present timelines of the BS according to an embodiment of the present invention, for the reader convenience each MAC entity is presented in a different row. The first MAC entity that is responsible for providing access service for the MSs that are located adjacent to the base station is presented in row 420a, whereas the second MAC entity that is responsible for feeding the RS is presented in row 420b. The backhaul feed links use some means (e.g. operator ID or access list) to prevent regular stations from joining the backhaul feed links.

The third row (430) presents a timeline of a BS in accordance with the present invention having two MAC entities. Unlike the first row, the DL area has two different preambles and MAPs while the UL area has two different ranging zones, since the two MAC entities serve different purposes. The first MAC entity is connected by an access link to adjacent MSs and provides them with access service, while the second MAC entity is connected by a backhaul feed link to the RS and feeds the RS with the necessary information so that the latter may serve other MSs. For illustrating the above, each part of the frame is described as follows:

- 432 is the DL zone associated with the first MAC entity. It has its own preamble and MAP and it is designated to provide access service to MSs located adjacent to the BS.
- 434 is the DL zone associated with the second MAC entity. It has its own preamble and MAP and it is designated to feed the RS.
- 436 is the UL zone associated with the first MAC entity. It has its own ranging zone and it is designated to receive data transmitted from MSs adjacent to the BS.
- 438 is the UL zone associated with the second MAC entity. It has its own ranging zone and it is designated to receive data transmitted from the RS.

The fourth row (440) presents an embodiment of a timeline of operating an RS according to the present invention. The RS is adapted to communicate with a plurality of MSs located at a far enough distance from the BS, to enable better usage of the limited resources. For illustrating the above, each part of the frame is described as follows:

- 442 is the DL zone associated with the RS. It has its own preamble and MAP and it is designated to provide access service to MSs located adjacent to the RS. However as will be appreciated by those skilled in the art, the data transmitted to the MSs with a certain frame, comprises data that was received by the RS from the BS in a preceding frame.

444 is the time zone where the RS is operative to receive data from the BS.

446 is the UL zone associated with the RS. It has its own ranging zone and it is designated to receive data from MSs located adjacent to the RS.

448 is the time zone where the RS transmits data to the BS.

By comparing the parts in the BS's and the RS's frames designated for communicating with the MSs, one may easily observe that there is a complete overlapping between them, which allows, among other things, the MS to perform a smooth handover between the BS and the RS, and vice versa.

Although the present invention has been described in relation to the IEEE 802.16e, still, as will be appreciated by those skilled in the art, it may relate also to systems operating in a TDD mode while complying with other protocols. Preferably, such optional protocols for communication between a Base Station and one or several Mobile Stations may be characterized as follows:

1. Communications between Base Station and one or several Mobile Stations occur within frame intervals of constant duration;
2. A frame interval includes one or several time slots for preambles;
3. A frame interval includes one or several messages that describe the structure of the frame (e.g. MAPs); and
4. A frame may be divided into slots with different direction of transmissions, for example downlink (DL) and uplink (UL).

It is to be understood that the above description only includes some embodiments of the invention and serves for its illustration. Numerous other ways of achieving the same functionality of using relay stations in a cell through which communications are carried out in compliance with the IEEE 802.16e may be devised by a person skilled in the art without departing from the scope of the invention, and are thus encompassed by the present invention.

The invention claimed is:

1. A wireless communication system comprising:
one or more Relay Stations (RSs) adapted to operate in a Time Division Duplexing (TDD) type of wireless communication network, said network comprising at least one Base Station (BS) operative to communicate with said RS and with an IP network, and a plurality of Mobile Subscribers (MSs), wherein said RS comprises:
a subscriber terminal operative in conformity with IEEE 802.16e Standard; and
said at least one BS operative in conformity with said IEEE 802.16e Standard, and
wherein said subscriber terminal and said at least one BS belonging to said one or more RSs are connected to each other, and wherein all communications transmitted from said at least one BS to said one or more RSs are in conformity with said IEEE 802.16e Standard; and
wherein said at least one BS comprises at least two MAC entities operative in a single sector, wherein one of said at least two MAC entities is an access MAC entity operative to communicate with MSs located within said sector, whereas a second of said at least two MAC entities is an RS feeding MAC entity operative to communicate with said one or more RSs located in said sector,
wherein a timeline of one of said MAC entities is shifted in time with respect to the other MAC entity to allow transmitting preambles associated with each of the access MAC entity and the RS feeding MAC entity, at different times;
wherein both a DL period and a UL period associated with each of said at least two MAC entities are divided into a silent part and an active part, so that that the one or more RSs receive the preamble, control + MAP information and DL Data of the RS feeding MAC entity of said at least one BS at a time in which said one or more RSs do not convey transmissions to MSs along to their respective access links; and
wherein said one or more RSs receive communications from MSs connected to their respective access links at a time at which said one or more RSs do not convey communications to the RS feeding MAC entity of said at least one BS.

2. The system according to claim 1, wherein said one or more RSs and said at least one BS are operative to handover an MS that is currently being in communication with one, to be in communication with the other.

3. The system according to claim 1, wherein said at least one BS and at least one of said one or more RSs are operative to handover an MS that is currently being in communication with one, to be in communication with the other.

4. The system according to claim 1, wherein said at least one BS is further operative to prevent any of said at least one MS being served by said at least one BS to connect to said at least one other of said at least two MAC entities that is used to communicate with at least one of said one or more RSs.

5. The system according to claim 1, wherein each of said at least two MAC entities is associated with a distinct timeslot different than any other of the at least two MAC entities, for the transmission of communications towards their respective destinations.

6. The system according to claim 1, wherein said at least one BS is further adapted to determine dynamically, based on one or more pre-defined criteria, air interface resources that will be allocated for conveying communications from said one or more RSs.

* * * * *